United States Patent [19]

Masclet

[11] 4,034,958

[45] July 12, 1977

[54] INDEPENDENT DEVICE FOR OPENING AND CLOSING ROTARY VALVES BY REMOTE CONTROL

[75] Inventor: Jean Masclet, Paris, France

[73] Assignee: Messier Hispano, Montrouge, France

[21] Appl. No.: 575,060

[22] Filed: May 6, 1975

[30] Foreign Application Priority Data

June 14, 1974 France .............. 74.20828

[51] Int. Cl.² ............. F16K 31/124; F16K 31/54
[52] U.S. Cl. .............. 251/28; 91/420;
91/468; 92/85 B; 251/31; 251/54; 251/58;
251/229; 251/250
[58] Field of Search ........... 74/46, 89.17, 109;
91/420, 461, 468; 92/85 B, 85 R, 143; 251/94,
136, 138, 232, 250, 48, 54, 279, 280, 58, 229, 28, 31

[56] References Cited

U.S. PATENT DOCUMENTS

| 378,041 | 2/1881 | Cresswell | 251/250 |
|---|---|---|---|
| 404,472 | 6/1889 | Dunn | 92/85 B |
| 1,248,261 | 11/1917 | Byron | 74/46 |
| 1,307,114 | 6/1919 | Chambers | 251/250 |
| 1,545,058 | 7/1925 | Merritt | 251/250 |
| 2,779,591 | 1/1957 | Huck | 92/143 |
| 2,963,260 | 12/1960 | Siravo | 251/250 |
| 3,132,662 | 5/1964 | Allen | 92/143 |
| 3,338,140 | 8/1967 | Sheesley | 251/250 |
| 3,412,645 | 11/1968 | Kirk | 91/420 |
| 3,431,985 | 3/1969 | Bowen | 92/85 B |
| 3,892,165 | 7/1975 | Lioux | 91/420 |
| 3,945,206 | 3/1976 | Krause | 60/416 |

FOREIGN PATENT DOCUMENTS

650,280 2/1951 United Kingdom .............. 251/279

Primary Examiner—Martin P. Schwadron
Assistant Examiner—G. L. Walton

[57] ABSTRACT

A device for opening and closing a rotary valve by remote control comprising a cylinder having a main bore in which a movable unit is slidably mounted in fluid tight manner and which can be displaced in opposite directions by a pressurized fluid supplied by either of two pressurized fluid sources which can be remotely actuated in independent fashion. A sequencing mechanism is mounted in the cylinder for simultaneously applying the pressurized fluid from an activated source to a corresponding end face of the movable unit while connecting the other end face with the atmosphere. The movement of the slidable unit is transmitted to the rotary valve through a rack and pinion arrangement and a linkage composed of cranks and a connecting rod so arranged that when the valve is in either of its end positions it cannot produce movement of the linkage due to alignment of the axis of rotation of the pinion and the connection points of the rod to the cranks.

5 Claims, 6 Drawing Figures

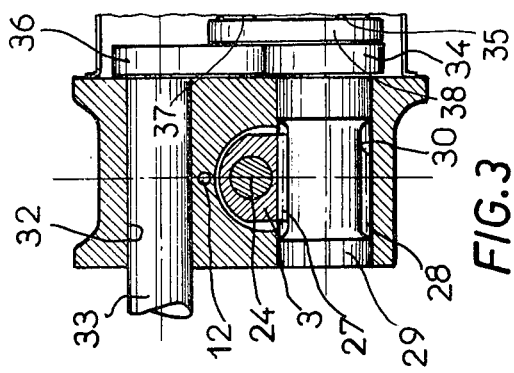
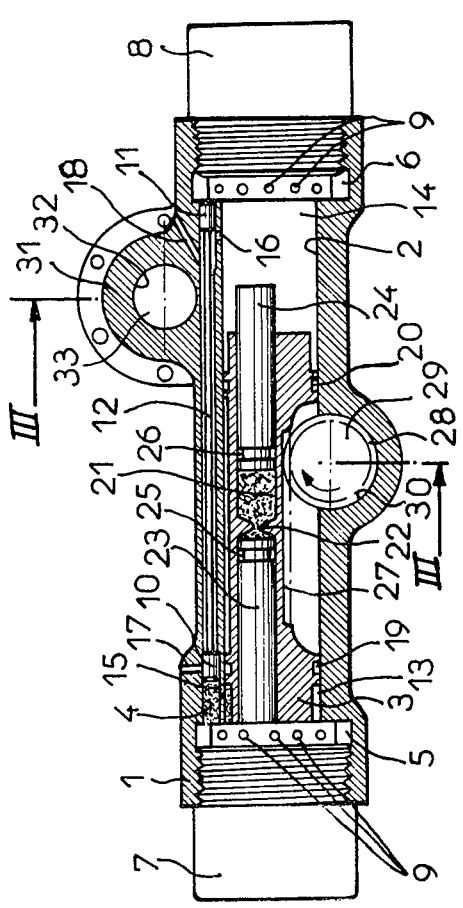
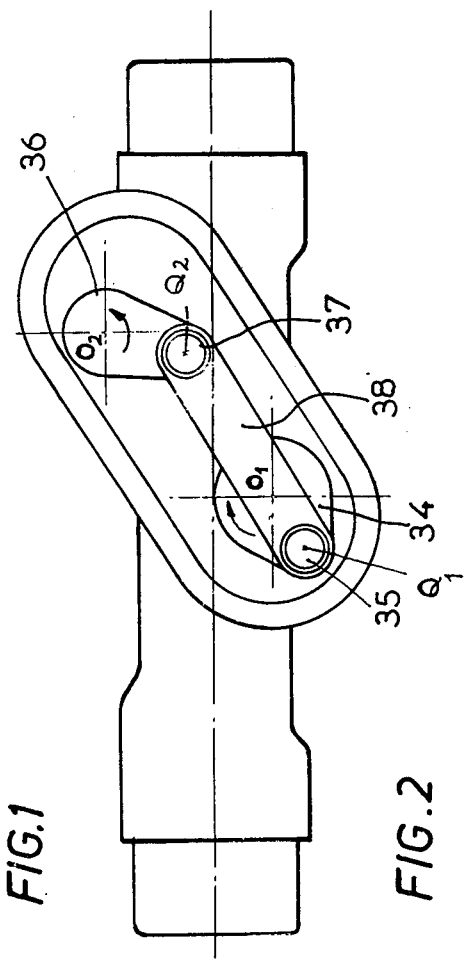

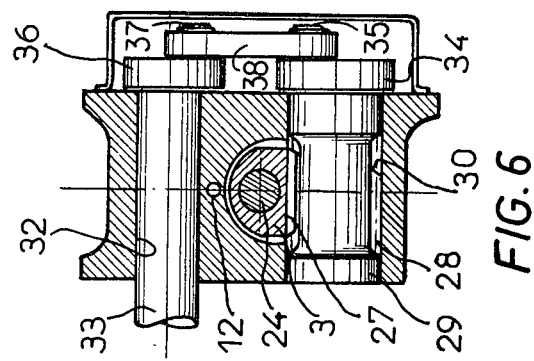
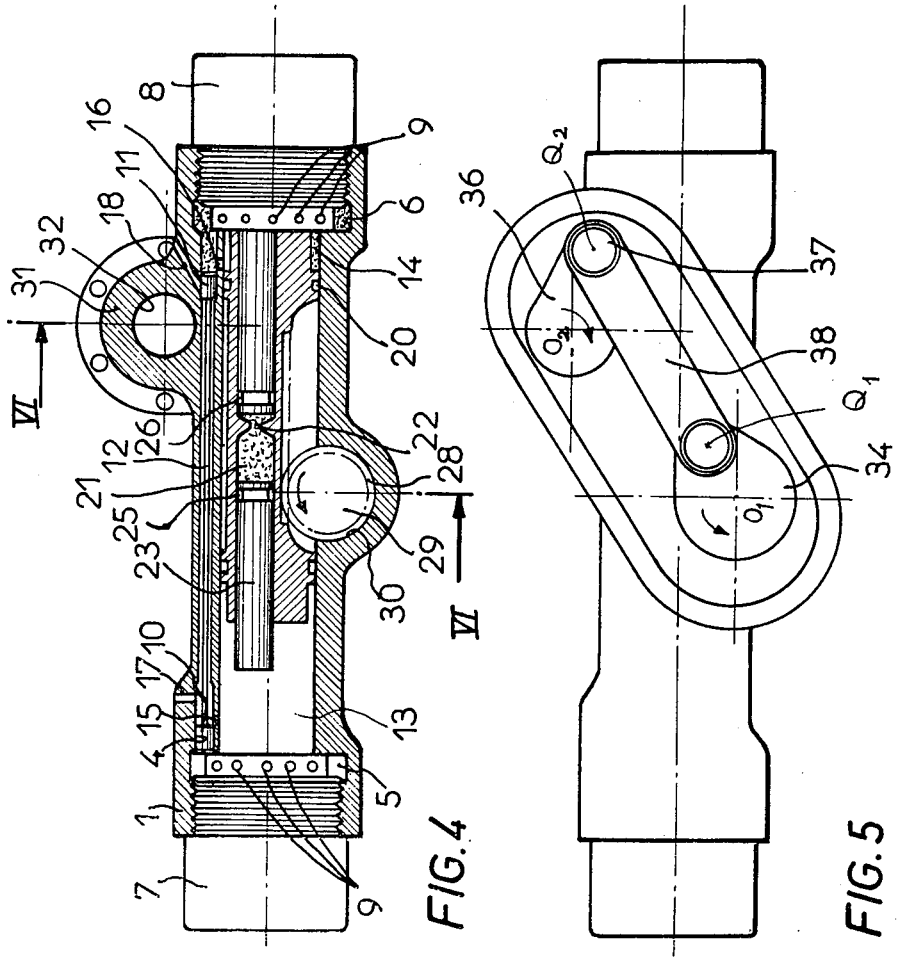
FIG. 6
FIG. 4
FIG. 5

INDEPENDENT DEVICE FOR OPENING AND CLOSING ROTARY VALVES BY REMOTE CONTROL

FIELD OF THE INVENTION

The present invention relates to an independent device for opening and closing rotary valves by remote control, and is more particularly but not exclusively concerned with controlling safety valves of the butterfly or plug type used in fluid-conveying circuits required to be operated or shut off in a reliable and rapid manner, for example ventilation, cooling, air-conditioning or fire-prevention circuits used in a wide variety of industrial installations.

BACKGROUND

The means currently used in the known devices call for the employment of bulky and expensive components requiring considerable inspection and servicing; these means also require the provision of energy from an external source in order to operate, and they do not incorporate any mechanism capable of holding the valve in its extreme positions by means of a positive locking action.

SUMMARY OF THE INVENTION

An object of the present invention is to eliminate these disadvantages and for this purpose it provides a valvecontrol device of simple design which operates independently and which enables the speed of operation to be controlled and the direction of rotation of the valve to be reversed, and permits the motor torque to be increased and then maintained after the valve has completed its movement so as to provide, on the other hand, positive locking of the valve in the open or closed position and, on the other hand, a permanent force whereby the moving part of said valve is applied to the seat of the valve, with or without compression of an elastomeric sealing element.

The control device in accordance with the invention is characterized in that it comprises: a double-action piston-and-cylinder unit having a main bore in which there is slidably mounted in a fluid-tight manner, a movable unit which can be displaced in either direction by a pressurized fluid supplied by two pressurized-fluid sources which can be actuated as required; a sequencing mechanism for simultaneously applying fluid from one of the sources to the corresponding end face of the movable unit and bringing the other end face into communication with the atmosphere; and a mechanism for transmitting movement through which the movable unit acts on the rotating spindle of the valve and which comprises a rack carried by the movable unit, a pinion meshing with the rack, a first crank solidly connected to the shaft of the pinion, a second crank solidly connected to the pivot shaft of the rotary valve, and a connecting rod linked to the two cranks, the position of the connecting rod, on completion of the opening or closing movement of the valve, being such that the axes along which it is linked to the cranks and the axis of rotation of said first crank are substantially in the same plane.

Thus, because of the three above-mentioned axes being in the same plane, any return movement of the second crank and thus of the valve which is carried by the second crank is rendered impossible.

The pressurized-fluid sources are known per se and may be constituted either by generators of the pyrotechnical type, or by hermetically sealed reservoirs containing the pressurized gas and adapted to release this gas by means of a pyrotechnical device.

In a particular embodiment of the invention, the sequencing mechanism is mounted in a secondary bore parallel to the main bore and having at its ends first orifices communicating with the main bore and second orifices communicating with the atmosphere, said sequencing mechanism comprising two slides separated by a rod adapted to transmit the entire sliding movement of one of the slides to the other slide and vice versa, the outer face of each slide permanently communicating with the corresponding pressurized-fluid source, so that when one pressurized-fluid source is energized, the pressurized-fluid produced pushes the assembly comprising the slides and the rod into a position in which pressure can be transmitted, through the first corresponding orifice, to that face of the movable unit presented to the energized pressurized-fluid source, and in which position the other face of the movable unit communicates with the atmosphere through the corresponding first and second orifices.

An embodiment of the device in accordance with the invention will now be described by way of non-limiting example and with reference to the annexed drawings in which:

BRIEF DESCRIPTION OF THE DRAWING

FIG. 1 is a longitudinal section through the device along the axis of the piston-and-cylinder unit, the movable unit being shown, in this view, in one of its two end positions;

FIG. 2 is an elevational view of the device and shows the mechanism for transmitting force in the end position shown in FIG. 1;

FIG. 3 is a cross-section taken on line III—III in FIG. 1; and

FIGS. 4, 5 and 6 are views similar to those of FIGS. 1, 2 and 3, respectively, but showing the movable unit in the other end position.

DETAILED DESCRIPTION

The device illustrated in the Figures consists mainly of a double-action piston-and-cylinder unit comprising a cylinder 1 having a main bore 2 in which a movable unit 3 is slidably mounted. A second bore 5, parallel to the main bore and accommodating a sequencing mechanism, is also formed in the cylinder.

More precisely, the body of the cylinder has a chamber 5 at one of its ends and a chamber 6 at the other end, the diameters of these chambers being sufficiently great to straddle the main bore 2 and the secondary bore 4. The chambers 5 and 6 each have an internal screw-thread into which can be screwed sources 7 and 8 respectively providing pressurized gaseous fluid which are known per se and may be constituted for example by two sealed reservoirs containing a pressurized gas which may be released by means of a pyrotechnical device, not shown, which can be operated at a distance therefrom.

The inner face of each of the pressurized-fluid sources 7 and 8 bears against a shoulder which is formed between the main bore 2 and the chambers 5 and 6 respectively, a seal thus being established between said bore and each of said chambers. The pressurized fluid generated by the souces 7 and 8 passes through orifices 9 into the interior of the associated chamber 5 or 6, the chamber 6 communicating with the adjacent end of the secondary bore 4.

The sequencing mechanism proper comprises two slides 10 and 11 slidably mounted one at one end of the secondary bore and the other at its other end, and a transmission rod 12 slidably mounted between the two slides and permitting the latter to act on each other. Depending upon the position of the slides 10 and 11, two cylinder chambers 13 and 14, delimited by the moving unit 3 and the pressurized-fluid sources 7 and 8, can be caused to communicate either with one of the corresponding chambers 5 or 6 by way of ports 15 and 16 formed between the secondary bore 4 and the main bore 2, or with the atmosphere by way of the ports 15 and 16 and ports 17 and 18 extending from the secondary bore to the atmosphere.

The movable unit 3 is formed by a double piston having a sealing ring 19, 20 at each of its two ends. The unit 3 is provided with movement-damping means, one particular form of which will now be described. The movable unit has a longitudinal bore 21 having, in a section thereof intermediate its two ends, a partition defining a throttle orifice 22. In this bore slide two pistons 23 and 24, one on each side of the partition; these pistons are provided with sealing means 25 and 26, and project into the cylinder chambers 13 and 14 respectively. The cavity between the two pistons is filled with a damping material, for example a viscous liquid or an elastomer.

Between the two sealing members, the movable unit is of reduced diameter and carries a longitudinal rack 27 which meshes with a pinion 28 which is mounted on a shaft 29 (FIG. 3) which is at right-angles to the movable unit and is mounted to rotate in a bore 30 in the body of the cylinder 1. The latter has a boss 31 in which is formed a bore 32 which is parallel to the bore 30 and accommodates a rotatable shaft 33 which is mechanically connected to the control shaft of the valve by means not illustrated.

As shown in FIGS. 2 and 3, the shaft 29 carries at one end a crank 34 having a crank-pin 35 which is offset from the axis of rotation $O_1$ of the crank 34. similarly, the shaft 33 has at one of its ends a crank 36 having a crank-pin offset from the axis of rotation $O_2$ of the crank 36. A rod 38 connects the crank-pin 35 to the crank-pin 37.

In the position illustrated in FIGS. 1 and 2, the axes $Q_1$ and $Q_2$, along which the connecting rod 38 is linked to the cranks 34 and 36, and the axis of rotation $O_1$ of the crank 34 are in the same plane. In this way any transmission to the shaft 29 of a motor torque applied by the valve to the shaft 33 is rendered impossible so that the movable unit 3 remains locked in its position as shown in FIG. 1.

Actuation of the pressurized-fluid source 7 pressurizes the annular chamber 5 in which said source is located. The action of the pressurized gas pushes the slide 10 which in turn moves the rod 12 and the slide 11. Movement of the slide 10 to the right in FIG. 1 has the effect of bringing the orifices 9 of the pressurized-fluid source 7 into communication with the cylinder chamber 13 by way of the orifice 17, and movement of the slide 11 has the effect of bringing the cylinder chamber 14 into communication with the exterior by way of the orifices 16 and 18. The pressure then acts on the movable unit 3 and pushes it towards the pressurized-fluid source 8. This translatory movement of the movable unit imparts, through the rack 27 and the pinion 28, a clockwise rotary movement on the shaft 29 and on the crank 34. The rod 38 moves and imparts to the crank 36 a counter-clockwise movement which the shaft 33 transmits to the valve.

The piston 24, driven by the movable unit 3, is stopped when its end strikes the inner face of the pressurized-fluid source 8. By way of the throttle orifice 22, the relative movement between the movable unit and the piston 24 presses the elastomeric material, contained in the cavity between the piston 24 and the orifice 22, towards the cavity between the orifice 22 and the piston 23 which is pushed back.

The pressure necessary for pressing the elastomeric material through the throttle orifice offers a force resisting displacement of the movable unit 3, which force is a function of the speed of displacement and therefore damps the movement of the movable assembly.

FIG. 5 illustrates the position of the rod 38 at the end of its movement. It will be seen that the axes $Q_1$ and $Q_2$ along which this rod is linked to the cranks 34 and 36 are aligned with the axis of rotation $O_1$ of the crank 34, and this makes it impossible for the crank 36 to move back whatever the motor torque applied by the valve to the shaft 33.

The reverse movement is carried out symmetrically upon operation of the pressurized-fluid source 8 which pressurizes the annular chamber 6 in which said source is located. The action of the pressurized gas pushes the slide 11 which in turn moves the rod 12 of the slide 10. Movement of the slide 11 to the left in FIG. 4 has the effect of bringing the chamber 6 into communication with the cylinder chamber 14 by way of the orifice 16, and movement of the slide 10 has the effect of bringing the cylinder chamber 13 into communication with the exterior by way of the orifices 15 and 17.

The pressure then acts on the movable unit 3 and pushes it towards the pressurize-fluid source 7. The translatory movement of the movable unit imparts, through the rack 27 and the pinion 28, a counter-clockwise movement to the shaft 29 and to the crank 34. The rod 38 moves and imparts to the crank 36 a clockwise movement which the shaft 33 transmits to the valve.

The piston 23 driven by the movable unit 3 is stopped when its end strike the inner face of the pressurized-fluid source 7. By way of the throttle orifice 22, the relative movement between the movable unit 3 and the piston 23 presses the elastomeric material contained in the cavity between the piston 23 and the orifice 22 towards the cavity between the orifice 22 and the piston 24 which is pushed back. The assembly is then in the position illustrated in FIGS. 1, 2 and 3.

What is claimed is:

1. An independent device for opening and closing a rotary valve by remote control, said device comprising a piston-and-cylinder unit constituted by a cylinder having a main bore, a movable unit slidably mounted in fluid-tight manner in said bore for displacement in opposite directions, means for supplying a pressurized-fluid including two pressurized-fluid sources for displacing the movable unit in respective directions, a sequencing mechanism for simultaneously applying the fluid from one of the sources to a corresponding end face of the movable unit while bringing the other end face into communication with the atmosphere said movable unit including movement-damping means comprising two pistons slidably mounted in a fluid-tight manner and projecting at the ends of a bore extending axially along the movable unit, said bore having, in an intermediate section thereof, a reduced portion forming a throttling orifice through which is pressed a damping material which fills a cavity between the two pistons, and means for transmitting movement from said movable unit to the rotary valve comprising a rack carried by the movable unit, a pinion meshing with the rack, said pinion including a shaft, a first crank solidly connected to the shaft of the pinion, a second crank solidly connected to a pivot shaft of the rotary valve, and a connecting rod linked to the two cranks, the position of the connecting rod, on completion of the opening and closing movements of the valve, being such that the axes, along which the connecting rod is linked to the cranks, and the axis of rotation of said first crank are substantially aligned in the same plane.

2. A device according to claim 1 in which the pressurized gaseous fluid sources are constituted by sealed reservoirs containing a pressurized gas which may be released by a pyrotechnical device.

3. A device according to claim 1 in which said sequencing mechanism is mounted in a secondary bore which is parallel to the main bore and has at its ends first orifices which communicate with the main bore, and second orifices which communicate with the atmosphere, said sequencing mechanism comprising two slides, a rod connecting said slides to transmit the entire sliding movement of one of the slides to the other slide and vice versa, each slide having an outer face permanently communicating with a corresponding pressurized-fluid source so that when pressurized fluid is supplied from a pressurized-fluid source, the pressurized fluid pushes the assembly consisting of the slides and the rod into a position in which the pressure of the fluid is communicated, through the first corresponding orifice, to the face of the movable unit presented to the pressurized-fluid source from which pressurized fluid is supplied, the other face of the movable unit being brought into communication with the atmosphere through the first corresponding orifice and the second corresponding orifice.

4. A device according to claim 1 in which the two cranks rotate in opposite directions with respect to each other.

5. An independent device for opening and closing a rotary valve by remote control, comprising
a double-action piston-and-cylinder unit comprising a cylinder having a main longitudinal bore and a secondary bore parallel to the main bore and having two ends communicating, on the one hand with the main bore through two first orifices, and, on the other hand, with the atmosphere through two second orifices formed in the cylinder;
a chamber formed at each end of the cylinder and straddling the main bore and the secondary bore;
two pressurized-fluid sources, independently actuable, secured in the chambers, each source bearing in a fluid-tight manner at an inner face against a shoulder formed between the main bore and each of the chambers;
a movable unit slidably mounted in the main bore and, together with the pressurized-fluid sources, defining two working chambers, two annular chambers being defined by the cylinder and the pressurized-fluid sources respectively, and orifices through which fluid from the pressurized-fluid sources is supplied into said annular chambers;
a passage by which each annular chamber communicates permanently with the adjacent end of the secondary bore;
two slides each slidably mounted at an end of the secondary bore such that the outer faces of the two slides communicate with said annular chambers;
a rod connecting the two slides to transmit the movement of one of the slides to the other so that when one of the pressurized-fluid sources is energized, pressurized-fluid is supplied thereby and, by means of the rod, presses the corresponding slide together with the second slide into a position in which the adjacent working chamber is brought into communication, through the first corresponding orifice, with the pressurized annular chamber, and in which the other working chamber is brought into communication with the atmosphere through other first and second orifices;
a longitudinal bore being provided in said movable unit, which bore has a throttling orifice in a median section thereof;
two pistons mounted in a fluid-tight manner one at each end of said longitudinal bore, the cavity between the two pistons being filled with elastomeric material;
a longitudinal rack carried by the movable unit;
a first shaft rotatably mounted in the main bore and carrying, on the one hand, a pinion meshing with said rack, and on the other hand, a first crank;
a second crank shaft mounted for rotation in a bore formed in the cylinder and carrying a second crank mechanically connected to a rotary shaft of the valve, and
a rod connecting a crank-pin of the first crank to a crank-pin of the second crank, the position of the rod, on completion of the opening and closing movements of the valve, being such that the two axes, along which the rod is connected to the cranks, and the axis of rotation of the first crank are substantially aligned in the same plane.

* * * * *